Figure 1:
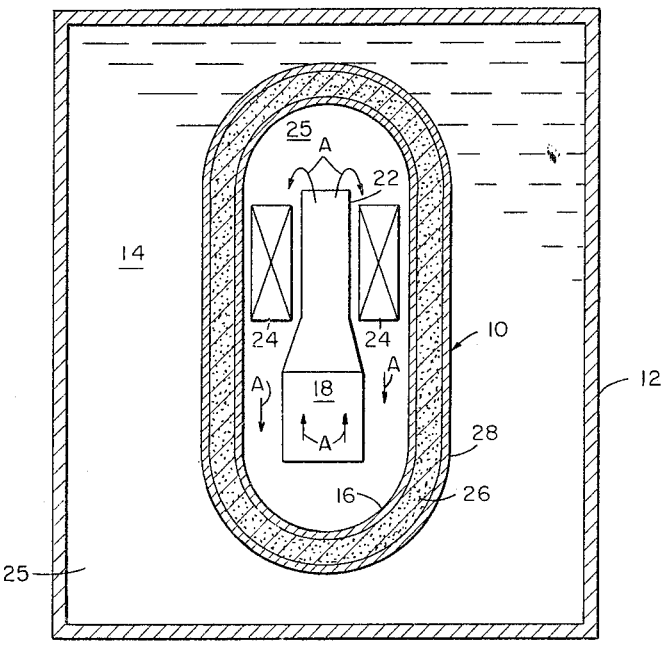

Sept. 27, 1966  T. MacKENZIE CAMPBELL, JR., ET AL.  3,275,523
NUCLEAR REACTOR WET THERMAL INSULATION Filed April 30, 1965

INVENTORS.
THOMAS M. CAMPBELL, JR
WALLACE MARKERT, JR.
BY

United States Patent Office 3,275,523
Patented Sept. 27, 1966

3,275,523
NUCLEAR REACTOR WET THERMAL
INSULATION
Thomas MacKenzie Campbell, Jr., and Wallace Markert, Jr., Alliance, Ohio, assignors, by mesne assignments, to the United States of America as represented by the United States Atomic Energy Commission
Filed Apr. 30, 1965, Ser. No. 452,419
3 Claims. (Cl. 176—44)

This invention relates to insulating a nuclear fission reactor and more particularly to insulating a nuclear reactor in wet containment.

Rapid strides in the development of nuclear fission reactors have made it possible to use nuclear energy sources for ship propulsion. Improvements in the nuclear steam generator to permit substantial reductions in the weight and volume of the reactor power plant equipment make it entirely probable that in time the nuclear powered ocean going vessel will be a common occurrence, and indeed, the next major advance of ocean-going commerce may very well be in this area.

One of the technical problems still concerning the designer is the containment for the reactor which will provide adequate protection in the event of an accidental discharge through the pressure vessel which houses the reactor core and at the same time is not excessively large and bulky but will provide adequate thermal insulation effectively and economically.

A typical nuclear steam generator of concern in this invention is that shown in U.S. Patent No. 3,150,051 issued on Sept. 22, 1964. That patent describes a compact light water cooled and moderated nuclear fission reactor in which superheated steam is generated which would be useful in steam turbines for the direct drive of ship's propulsion apparatus and/or for the production of electricity. All of the steam producing equipment is located entirely within the reactor pressure vessel and represents an important advance in the design of reactors for use aboard ocean-going vessels.

It has been proposed that the pressure vessel housing the steam generation equipment be immersed in a pool of water, this type of arrangement being generally described as a wet containment. The advantages of this type of reactor containment are quite obvious. In the event of reactor vessel failure, leakage would be into a larger body of cooler water which would contain successfully the accident and be capable of absorbing any large excursions of heat generation. Even more important is that the wet containment would be capable of allowing normal operation of the reactor with a leaky or damaged insulating jacket for periods of time sufficiently long that the leaks need not be repaired until the plant is shut down for normal maintenance. A major drawback of a wet containment has been the excessive loss of heat out of the reactor vessel to the containment water and the extreme thermal stresses imposed thereby on the pressure vessel.

This invention overcomes the problems associated with the wet containment of a nuclear steam generator by providing for an insulating jacket on the pressure vessel which will limit heat loss therethrough and minimize thermal stresses in the vessel wall. It has been found that the use of an inexpensive material in a relatively moderate volume, that is a layer of fine silica and surrounding the pressure vessel can be used successfully for this purpose provided baffles are utilized to prevent the circulation of steam adjacent to the vessel wall.

It is thus a first object of the invention to provide thermal insulation for a heated vessel.

It is also an object of this invention to provide an arrangement for thermally insulating a nuclear steam generator.

A further object of the invention is apparatus providing for the wet containment of a nuclear fission reactor.

Still a further object is an arrangement to insulate a nuclear reactor inexpensively and efficiently.

Figure 2:
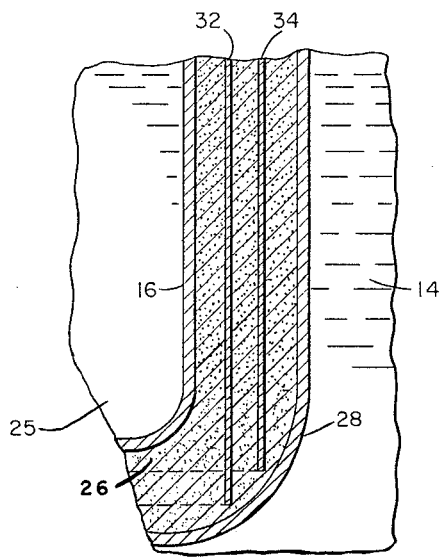

Other objects and advantages of this invention will hereinafter become obvious from the following description of a preferred embodiment of the invention taken with the accompanying drawing in which:

FIG. 1 illustrates schematically a nuclear reactor immersed within a wet containment; and FIG. 2 is a detail of the inventive insulating arrangement for the reactor shown in FIG. 1.

Referring to FIG. 1, there is illustrated somewhat schematically a nuclear reactor 10 immersed in an outer containment vessel 12 which is filled with water 14. Reactor 10 consists of a pressure vessel 16 within which are a reactive core 18 having a chimney 22 extending above, and heat exchange apparatus 24 within which water is vaporized. Core 18 would be provided with vertical cooling channels (not shown) to permit coolant to flow therethrough. Pressure vessel 16 would similarly be filled with water 25. The water within the cooling channels of core 18 would be heated and rise through chimney 22 and out the top thereof, with flow continuing downwardly in the annular space around core 18 and chimney 22 through heat exchange apparatus 24. In this way the heat of fission generated in core 18 is transferred to heat exchange apparatus 24. The coolant water then re-enters core 18 from the bottom. Arrows A indicate the flow of primary coolant in reactor 10. While circulation of the primary coolant is shown as being accomplished by convection, it is understood that suitable positive pumping means may be utilized. Also, while not illustrated, it is understood that heat exchange apparatus 24 would be provided with appropriate feed water inlets, sections for the production of superheated steam, and outlet pipes for delivering the steam outside of vessel 16 and containment 12. Other refinements, of course, are entirely possible and probable without departing from the principles of this invention.

In order to provide for the thermal insulation of pressure vessel 16 to limit the loss of heat to acceptable values and to avoid excessive thermal stresses and shock in the walls of pressure vessel 16, insulation 26 is provided in the space formed between pressure vessel 16 and an insulation jacket 28.

For details of insulation jacket 28, reference is made to FIG. 2 wherein is illustrated a detail of a portion of a wall of reactor vessel 16. There is shown vessel 16 and insulation jacket 28 the space therebetween being filled with a fine particulate having insulating qualities, such as silica sand. Between vessel 16 and jacket 28 are a pair of spaced cylindrical baffles 32 and 34 surrounding vessel 16. Baffles 32 and 34, which are solid, would extend the full length of jacket 28, coming close to or touching the top and bottom closures for jacket 28. The space between vessel 16 and jacket 28 containing sand would be filled with water from containment vessel 12 although normal operation of the reactor there would not be communication between the insulating space and containment vessel 12. If desired, the insulating space may be pressurized to a pressure exceeding that in containment vessel 12 to insure outward flow in the event of leaks.

In tests on the arrangement just described, a series of experiments were first conducted with the presence of sand only, without the baffles. It was discovered that a prohibitive heat loss was suffered. It was believed that this heat loss was being caused by internal recirculation of water in the sand, and that steam was being generated on the outer surface of vessel 16 and condensing on jacket 28, thereby producing high heat transfer coefficients.

A similar series of tests were run with the presence of baffles 32 and 34. A marked reduction in the rate of heat loss through insulation 26 was observed. With a three-inch annular space, reactor water temperature at 546° F. and containment water at 105° F., the heat loss was determined to be about 2000 B.t.u./hr.-ft.$^2$, which is well within satisfactory limits of operation of reactor 10. Hence it is seen that the addition of baffles as described makes it possible to use an inexpensive material effectively and successively to obtain the desired insulation of the reactor vessel.

It is thus seen that there has been provided an efficient, economic, and unique arrangement for the thermal insulation of a nuclear reactor situated in a wet containment. While only a preferred embodiment of the invention has been described it is understood that many variations thereof may be made without departing from the principles of this invention. Thus, the scope of the invention is not to be limited thereby, but it to be defined only by the appended claims.

We claim:
1. A wet containment for a nuclear fission reactor comprising:
  (a) a nuclear reactor enclosed in a vessel immersed within a containment vessel filled with liquid coolant;
  (b) a jacket surounding and spaced from said reactor vessel;
  (c) a fine particulate of non-reactive, relatively poor thermally conductive material filling the space between said reactor vessel and said jacket, said particulate being saturated with said liquid coolant;
  (d) and baffle means situated within said space and spaced from both of said reactor vessel and jacket to prevent the circulation of liquid coolant with said space between said pressure vessel and said jacket.
2. The apparatus of claim 1 in which said particulate is fine silica sand.
3. The apparatus of claim 2 in which said baffle means includes at least one baffle member completely surrounding said pressure vessel.

References Cited by the Examiner
UNITED STATES PATENTS

| | | | |
|---|---|---|---|
| 2,853,624 | 9/1958 | Wigner et al. | 176—51 |
| 3,021,273 | 2/1962 | Dix. | |
| 3,025,228 | 3/1962 | Whitelaw | 176—62 X |
| 3,150,051 | 9/1964 | Ammon | 176—53 |
| 3,151,034 | 9/1964 | Douglass. | |

L. DEWAYNE RUTLEDGE, *Primary Examiner.*